E. SCHALK.
STRAINER FOR COFFEE POTS.
APPLICATION FILED OCT. 17, 1912.
1,072,171.
Patented Sept. 2, 1913.
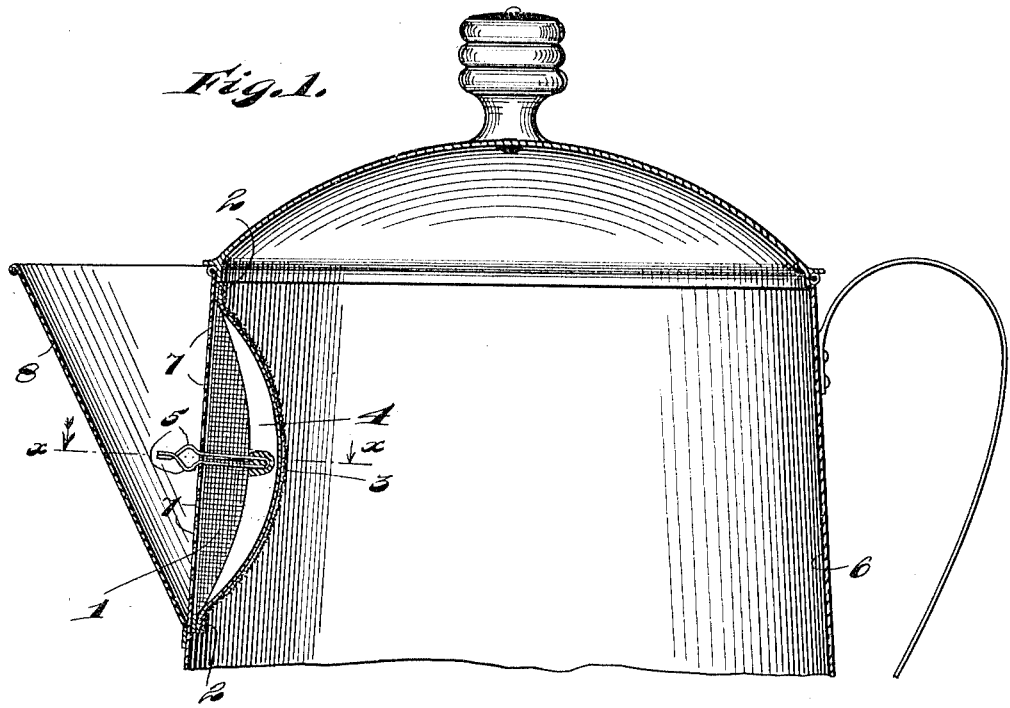
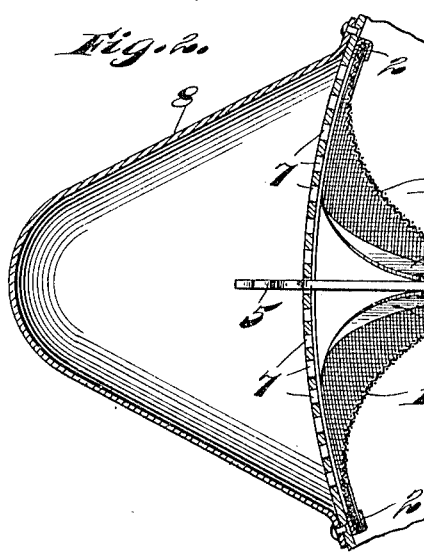
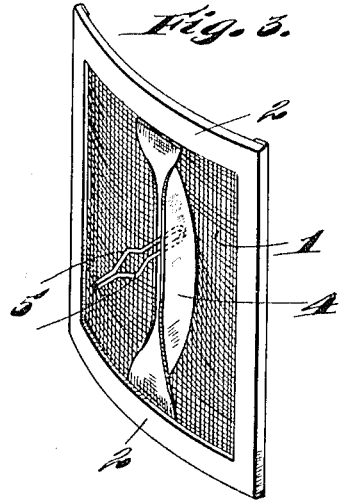

UNITED STATES PATENT OFFICE.

EMIL SCHALK, OF CHICAGO, ILLINOIS.

STRAINER FOR COFFEE-POTS.

1,072,171.  Specification of Letters Patent.  Patented Sept. 2, 1913.

Application filed October 17, 1912. Serial No. 726,285.

*To all whom it may concern:*

Be it known that I, EMIL SCHALK, a citizen of the United States, and a resident of the city of Chicago, county of Cook, and State of Illinois, have invented certain new and useful Improvements in Strainers for Coffee-Pots, of which the following is a specification.

My invention relates to improvements in strainers for coffee pots and the like and has for its object the production of a device of this character adapted for ready insertion into and removal from a coffee pot and which will be adapted, when arranged in a coffee pot, to effectually strain the coffee poured therefrom.

A further object is the production of a strainer which will be of simple and economical construction and hence of low cost to manufacture.

Other objects will appear hereinafter.

With these objects in view, the invention consists in the combinations and arrangements of parts hereinafter fully described and claimed.

The invention will be best understood by reference to the accompanying drawings forming a part of this specification and in which, Figure 1 is a central vertical section of the upper end portion of a coffee pot equipped with a strainer embodying my invention, the latter being also shown in section, Fig. 2 is a horizontal section taken on substantially line *x—x* of Fig. 1, and Fig. 3 is a perspective view of the strainer detached.

The preferred form of construction as illustrated in the drawing comprises a strainer consisting of a foraminated body 1 formed preferably of fine wire mesh, as shown. The edges of the body 1 are secured in a rigid frame or edging 2 which is bent upon itself in order to embrace the peripheral edges of said body, as clearly shown in the several views. The frame 2 is of curved form, as shown, to correspond with the curvature of the inner surface of the lateral wall of the coffee pot in which the same is designed to be used.

The central portion 3 of the body 1 is buckled or bellied outwardly in order to constitute a grip for readily attaching or detaching the device, it being clear that with this construction the device may be readily gripped between the thumb and first finger to facilitate attachment or detachment thereof. The portion 3 is reinforced by means of a transversely extending reinforcing bar or member 4, the respective extremities of which are secured in the upper and lower transverse bars of the frame or edging 2, the member 4 being curved to correspond with the formation of the portion 3 of the body, as shown in the several views.

The device is releasably secured in position in a coffee pot through the medium of spring arms 5, the rearward ends of which are secured rigidly to the reinforcing member 4 which is bent transversely upon itself to embrace the rearward ends of said arms. The arms 5 project parallelly from the member 4, the outer ends thereof being angularly formed for engagement with one of the discharge openings of the coffee pot in which the strainer is arranged, to releasably secure the latter in operative position.

In using the strainer the same is arranged in the pot 6 over the discharge openings 7 thereof provided in the lateral wall of the pot, communicating with the spout 8 thereof. In the arrangement of the strainer in operative position the outer ends of the securing arms 5, which are normally in close proximity with each other, are forced through one of the discharge openings 7. The angular portions of said arms 5 are spaced apart a distance greater than the diameter of the discharge opening engaged thereby and so that in the insertion of said arms into the opening it is necessary to press said arms toward each other to allow the angular or bulging portions thereof to pass through the opening. After said portions of said frame have passed through the opening, the resiliency of the arms will move said arms outwardly so that said arms engage against the outer surface of the lateral wall of the pot which serves to yieldingly or releasably hold the device in operative position. With the arrangement disclosed it will be seen that the attachment of the strainer to a coffee pot or the detachment thereof from the pot is rendered very easy so that attachment or detachment may be accomplished with expedition.

While I have illustrated and described the preferred form of construction for carrying my invention into effect this is capable of variation and modification without departing from the spirit of the invention. I, therefore, do not wish to be limited to the precise details as set forth but desire to avail myself of such variations and modifications as come within the scope of the appended claim.

Having described my invention, what I claim as new and desire to secure by Letters Patent is:

The combination with a coffee pot or the like having discharge openings in the lateral wall thereof, of a strainer arranged upon the inner side of said pot over said openings, said strainer comprising a foraminated body having a rigid edging shaped to correspond with the curvature of the lateral wall of the pot, a member having its opposite ends secured to said edging, the central portion of said body being buckled outwardly by said member to constitute a grip; and a pair of spring arms detachably secured to and projecting from said body releasably engaging one of said discharge openings for removably securing said strainer in operative position, substantially as described.

In testimony whereof I have signed my name to this specification in the presence of two subscribing witnesses.

EMIL SCHALK.

Witnesses:
 JOSHUA R. H. POTTS,
 A. A. OLSON.

Copies of this patent may be obtained for five cents each, by addressing the "Commissioner of Patents, Washington, D. C."